US005515735A

United States Patent [19]
Sarihan

[11] Patent Number: 5,515,735
[45] Date of Patent: May 14, 1996

[54] MICROMACHINED FLOW SENSOR DEVICE USING A PRESSURE DIFFERENCE AND METHOD OF MANUFACTURING THE SAME

[75] Inventor: Vijay Sarihan, Paradise Valley, Ariz.

[73] Assignee: Motorola, Inc., Schaumburg, Ill.

[21] Appl. No.: 367,603

[22] Filed: Jan. 3, 1995

[51] Int. Cl.$^6$ .................................................... G01F 1/38
[52] U.S. Cl. .................................... 73/861.47; 73/861.42
[58] Field of Search .......................... 73/861.42, 861.47,
73/861.48, 861.53, 204.21, 204.26, 861.21,
861.22, 721, 722

[56] References Cited

U.S. PATENT DOCUMENTS

| | | | |
|---|---|---|---|
| 4,221,134 | 9/1980 | Ekstrom, Jr. | 73/861.47 |
| 4,361,050 | 11/1982 | Coussot et al. | 73/861.47 |
| 5,125,275 | 6/1992 | Wilda et al. | 73/721 |
| 5,178,016 | 1/1993 | Dauenhauer et al. | 73/721 |
| 5,259,248 | 11/1993 | Ugai et al. | 73/721 |

OTHER PUBLICATIONS

Ljubisa Ristic, Sensor Technology and Devices, 1994, pp. 36–39, 399–401.

Primary Examiner—Richard Chilcot
Assistant Examiner—Max Noori
Attorney, Agent, or Firm—Kevin B. Jackson

[57] ABSTRACT

A flow sensor device including a body portion that provides a pressure differential when placed in fluid stream and a pressure sensor portion associated with the body portion to sense the pressure differential. In one embodiment, the body portion (13,72,113) includes a channel (16,76,116) that extends from an entrance side (24,44,124) to an exit side (26, 46). The channel (16, 76,116) has an inner portion (27, 47,87) between the entrance side (24, 44,124) and the exit side (26, 46). The channel (16,76,116) has a first cross-sectional area at the entrance side (24,44,124) and a second cross-sectional area at the inner portion (27,47,87), which is less than the first cross-sectional area. The pressure sensor portion (14,74,114) includes a diaphragm (18,38,78,118) and is associated with the body portion (13,72,113) such that when a fluid passes through the channel (16, 76,116), a pressure differential is sensed by the pressure sensor portion (14,74,114).

18 Claims, 4 Drawing Sheets

MICROMACHINED FLOW SENSOR DEVICE USING A PRESSURE DIFFERENCE AND METHOD OF MANUFACTURING THE SAME

BACKGROUND OF THE INVENTION

This invention relates, in general, to solid state sensor devices, and more particularly, to solid state flow sensor devices.

Flow measurements of fluids (gases and liquids) are critical in many application areas including biomedical, automotive, aerospace, chemical, and heating, ventilation, and air conditioning (HVAC) applications. Several techniques are known for measuring the flow velocity of fluids.

Hot wire anemometers are often used to measure or sense mass air flow. Hot wire anemometers typically consist of an electrically heated fine wire (usually platinum) exposed to a gas stream whose velocity is being measured. An increase in fluid velocity, other things being equal, increases the rate of heat flow from the wire to the gas, thereby tending to cool the wire and alter its resistance. In a constant-current anemometer, gas velocity is determined by measuring the resulting wire resistance. In a constant-resistance type anemometer, gas velocity is determined from the current required to maintain the wire temperature, and thus the resistance constant. The hot wire anemometer can be modified for liquid measurements, although problems arise from bubbles and dirt adhering to the wire. Hot wire anemometers are big, expensive, require expensive monitoring and/or control equipment, and are limited in their areas of use because the wire is exposed to the fluid under measurement.

A micro-machined silicon mass air flow sensor version of the hot wire anemometer also has been reported. This device uses temperature resistive films suspended over a micromachined cavity. Typically, heating and sensing resistors are formed in a cross pattern. Heat is transferred from one resistor to the other as a result of air flow. The imbalance in resistance caused by the heat transfer is directly proportional to the flow velocity. The micro-machined version of the hot wire anemometer is expensive, difficult to manufacture, and still requires expensive monitoring and/or control equipment.

Other known approaches to flow velocity measurements include venturi-type flow meters. Venturi-type flow meters operate on the principle that when a constriction is placed in a closed channel carrying a stream of fluid, an increase in velocity, and hence an increase in kinetic energy, occurs at the point of constriction. Based on an energy balance relationship, this increase in velocity results in an decrease in pressure. Flow velocity is obtained from, among other factors, the decrease in pressure, the cross-sectional area of the constriction, and the density of the fluid. Prior art venturi-type flow measurement devices are very bulky and heavy and are not suitable for applications where space is a premium and excessive weight is a concern. Also, prior art venturi-type devices require expensive monitoring and/or control equipment.

Accordingly, a need exists for a flow sensor that is suitable for use in many environments, that is cost-effective, that reduces external monitoring and/or control equipment requirements, that utilizes existing pressure sensing technology, and that is small and lightweight.

DETAILED DESCRIPTION OF THE DRAWINGS

Generally, the present invention provides a solid-state flow sensor device for measuring the flow velocity of fluids (gases and liquids). More particularly, the solid-state flow sensor device includes a body portion that provides or creates a pressure differential when the solid-state flow sensor device is placed in fluid stream and a pressure sensor portion that measures the pressure differential. Flow velocity is determined in part from the pressure differential. The present invention is better understood with reference to FIGS. 1–7 together with the following detailed description.

Figure 1:
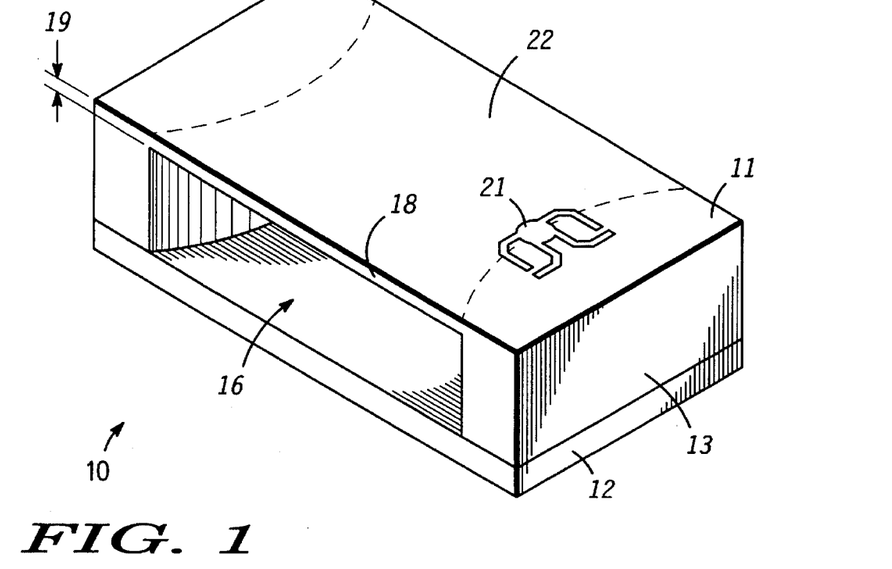
FIG. 1 illustrates a perspective view of an embodiment of a flow sensor device in accordance with the present invention.

FIG. 1 illustrates a perspective view of one embodiment of a solid-state or micro-machined flow sensor device 10 comprising a semiconductor die 11 and a cover or plate portion 12. Semiconductor die 11 preferably comprises silicon but other semiconductor materials may be used. Plate portion 12 functions to support semiconductor die 11 and preferably comprises a heat and chemically resistive material such as PYREX®, silicon, or the like. Preferably, plate portion 12 has a thermal coefficient of expansion (TCE) close to (within several points or parts per million) the TCE of semiconductor die 11. Plate portion 12 is bonded to semiconductor die 11 using well known glass frit processes or wafer bonding processes. In an optional embodiment, semiconductor die 11 and plate portion 12 are formed from a single piece of material.

Semiconductor die 11 includes a body portion or flow constricting portion 13 and a pressure sensor portion 14. Body portion 13 includes a micro-machined channel, duct, passage, or venturi portion 16 for passing a fluid having a velocity to be measured. Channel 16 passes from one side of body portion 13 to an opposite side (more clearly shown in FIG. 2). Pressure sensor portion 14 comprises a diaphragm or thin partition 18 and piezoresistive elements 21 formed on one or top side 22 of pressure sensor portion 14. Diaphragm 18 has a thickness 19, which, as will be explained in more detail below, is such that diaphragm 18 deflects according to a pressure differential existing above and below diaphragm 18 when a fluid having a velocity to be measured simultaneously passes in one direction above top side 22 and through channel 16.

Designs for piezoresistive elements 21 are well known. Piezoresistive elements 21 are formed using well known processing techniques including diffusion, photolithographic, and etch processing techniques. Pressure sensor portion 14 can further include signal processing circuitry elements and/or temperature and/or offset compensation circuitry elements to provide a fully integrated flow sensor device. A fully integrated flow sensor device reduces the requirements for external monitoring and/or control equipment.

Figure 2:
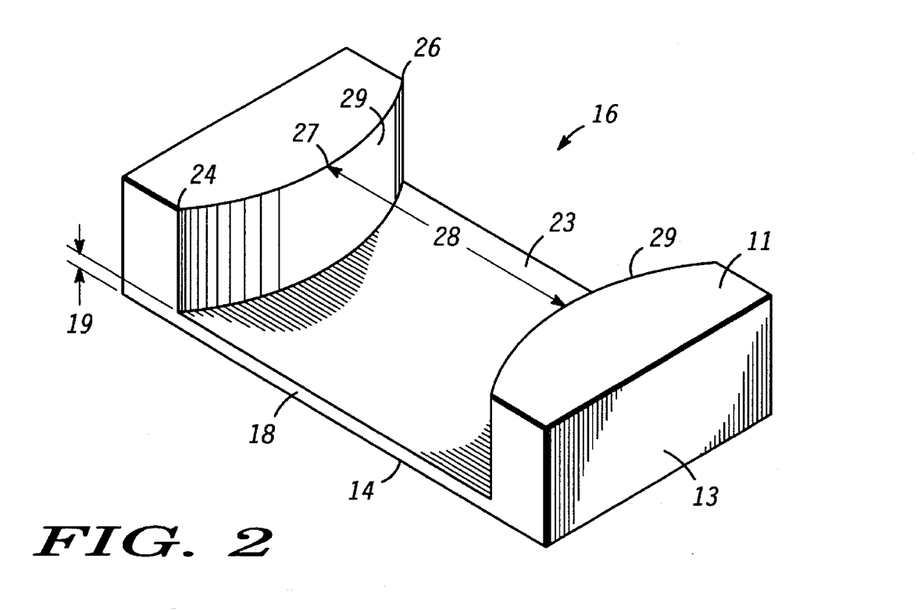
FIG. 2 illustrates a perspective view of a portion of the embodiment of FIG. 1.

FIG. 2 illustrates a perspective view of semiconductor die 11 showing body portion 13, channel 16, and opposite or lower side 23 of pressure sensor portion 14. Channel 16 extends through body portion 13 from an entrance side or first opening 24 to an exit side or second opening 26. In this embodiment, channel 16 tapers or constricts from entrance side 24 to an inner or throat portion 27 between entrance side 24 and exit side 26. Channel 16 has a span 28 at inner portion 27. Channel 16 has a specific cross-sectional area at entrance side 24 and a specific cross-sectional area at inner portion 27. The cross-sectional area of channel 16 at inner portion 27 is less than the cross-sectional area of channel 16 at entrance side 24. Preferably, channel 16 expands from inner portion 27 to exit side 26 such that the cross-sectional area of channel 16 at exit side 26 is greater than the cross-sectional area of channel 16 at inner portion 27.

In the embodiment shown in FIG. 2, opposed side-walls 29 of channel 16 have a rounded or curved shape or geometry. Channel 16 is formed in body portion 13 using conventional processing techniques including photolithographic and etch techniques. For example, when body portion 13 comprises silicon, a wet silicon etch such as KOH or HF/HNO$_3$ is used. Optionally, dry etch techniques such as reactive ion etching (RIE) or plasma etching are used. Chemical species and systems for dry etching semiconductor materials such as silicon are well known. For example, dry etching species for silicon include CF$_4$, SF$_6$, NF$_3$, Cl$_2$, and CCl$_2$F$_2$. In order to best control the geometry of channel 16, dry etching techniques are preferred.

Figure 3:
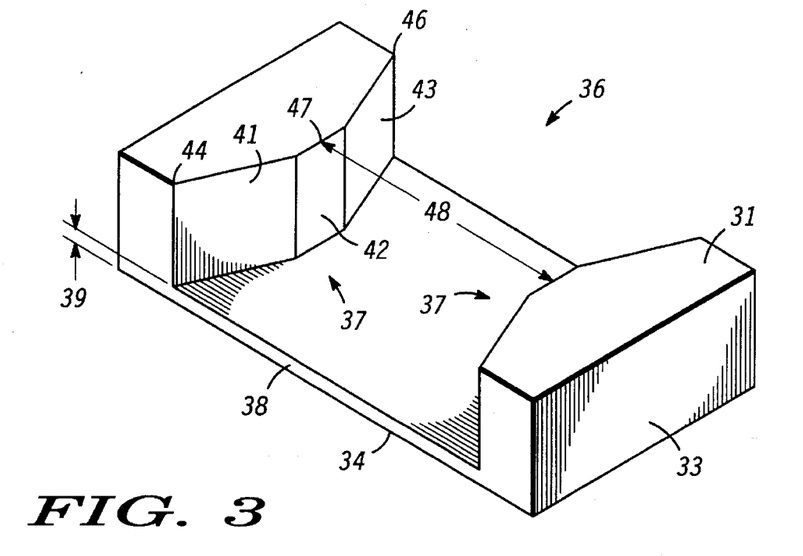
FIG. 3 illustrates a perspective view of another embodiment of a portion of a flow sensor device in accordance with the present invention.

FIG. 3 shows an optional embodiment of a semiconductor die 31 having body portion 33, a channel 36 with opposed side-walls 37, and a pressure sensor portion 34. Opposed side-walls 37 have straight portions 41, 42, and 43. Pressure sensor portion 34 includes a diaphragm 38 with a thickness 39. Similar to the embodiment of FIG. 2, the cross-sectional area of channel 36 at inner or throat portion 47 is smaller than the cross-sectional area of channel 36 at entrance side 44. Preferably, channel 36 expands from inner portion to an exit side 46. Channel 36 has a span 48 at inner portion 47. Like channel 16, channel 36 is formed using well known processing techniques.

It is understood that other channel shapes or geometries are possible as long as some constriction or reduction in channel cross-sectional area occurs. For example, one side wall of channel 16 or 36 can be straight, that is, no taper, and the opposite side wall can have the constricting shape shown in FIG. 2 or FIG. 3 or some other shape. Optionally, one side wall has one shape, and the opposite side wall has a different shape.

To measure or sense the flow velocity of a fluid, flow sensor device 10 is placed in a fluid stream. Pressure sensor portion 14 is associated with or coupled to body portion 13 such that when the fluid is passed in one direction over top side 22 (main stream flow) and through channel 16 (modified flow), diaphragm 18 deflects based upon the pressure differential or drop established by the flow constricting characteristics of channel 16. That is, on top side 22 of pressure sensor portion 14, diaphragm 18 is exposed to the unmodified or main stream flow and on lower side 23 of pressure sensor portion 14, diaphragm 18 is exposed to the flow modified by channel 16. Because channel 16 constricts the flow of the fluid, a pressure differential occurs compared to the main stream flow, which results in a deflection of diaphragm 18. This deflection is detected by piezoresistive elements 21 (shown in FIG. 1). The velocity of the fluid is then determined from the following equation:

$$V = \sqrt{\frac{2(P_1 - P_2)}{\rho((A_1/A_2)^2 - 1)}}$$

where V is the flow velocity, $P_1$ is the main stream pressure, $P_2$ is the pressure in channel 16, $\rho$ is the fluid density, $A_1$ is the cross-sectional area of channel 16 at entrance side 24, and $A_2$ is the cross-sectional area of channel 16 at inner portion 27. The pressure differential measured or sensed by diaphragm 18 is equal to $P_1-P_2$. The sensitivity of flow sensor 10 is altered by changing the constriction or reduction of cross-sectional area of channel 16 at inner portion 27, changing thickness 19 of diaphragm 18, and/or changing span 28 of channel 16. Similar results are achieved with the embodiment of FIG. 3.

When flow sensor device 10 is placed in an environment including hazardous materials, the outer surface of flow sensor device 10 is coated with an optional protective film that is resistant to the hazardous material or materials. Optionally, only top side 22 of pressure sensor portion 14 is covered to protect piezoresistive elements 21 and any additional circuit elements. The thickness of the protective film is such that the thickness does not affect the deflection characteristics of diaphragm 18 or pressure sensor portion 14 is compensated accordingly. Examples of protective films include dielectric passivations, organic passivations, or the like.

In a preferred embodiment of flow sensor 10 for measuring the flow velocity of air in the flow velocity range of 5 to 15 meters/sec, pressure sensor portion 14 preferably comprises a differential pressure sensor. Piezoresistive and circuit elements for differential pressure sensors are well known. Body portion 13 preferably comprises silicon. The cross-sectional area of channel 16 or 36 at inner portion 27 or 47 preferably is on the order of approximately 0.0010 to 0.0012 square centimeters (cm$^2$) (170 to 180 square mils). The cross-sectional area of channel 16 or 36 at entrance side 24 or 44 preferably is on the order of 0.010 to 0.012 cm$^2$ (1700 to 1800 square mils). Preferably, span 28 or 48 is on the order of approximately 0.20 to 0.23 cm (80 to 90 mils.)

Figure 4:
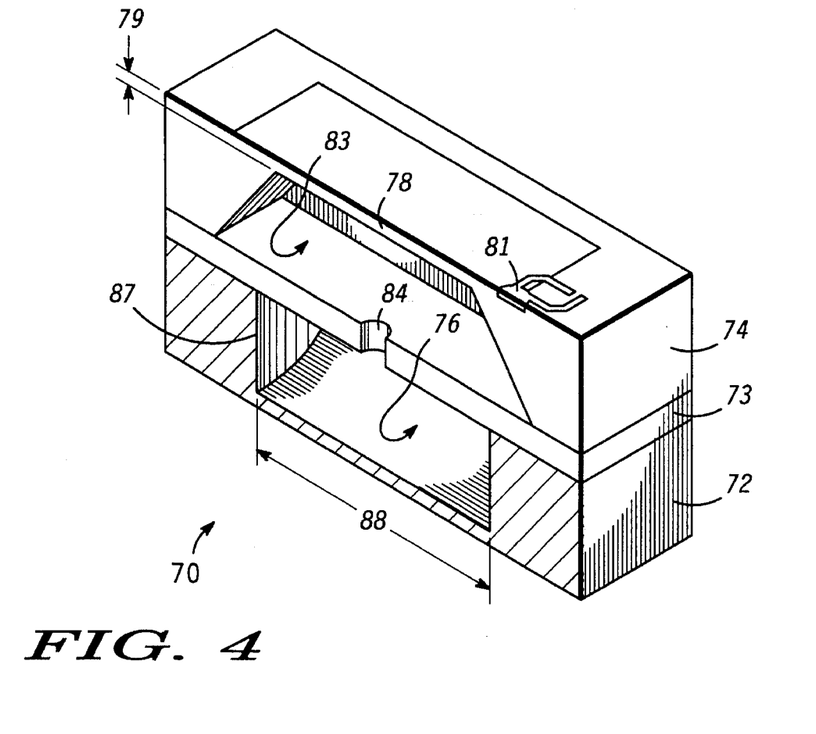
FIG. 4 illustrates a cross-sectional perspective view of an additional embodiment of a flow sensor device in accordance with the present invention.

FIG. 4 illustrates cross-sectional perspective view another embodiment of a flow sensor device 70 according to the present invention. Flow sensor device 70 comprises a body portion 72, a plate portion 73, and a pressure sensor portion 74. Body portion 72 includes a channel, duct, flow constricting passage, or venturi 76. The shape or geometry of channel 76 is similar to the geometries of channel 16 or 36. Other shapes for channel 76 are possible as long as the cross-sectional area of channel 76 is reduced or constricted somewhere between an entrance side and an exit side of channel 76. In this embodiment, body portion 72 comprises a semiconductor material, a metal material, a ceramic material, an organic material, or a composite material. The material selected for body portion 72 depends upon, among other things, the particular application environment and the characteristics of the fluid.

When body portion 72 comprises a semiconductor material such as silicon, semiconductor processing techniques including etch techniques as set-out above are used. When body portion 72 comprises a metal, milling or casting processes or the like are used. When body portion 72 comprises a ceramic, viscous forming or sintering processes or the like are used. When body portion 72 comprises an organic material, milling or molding processes or the like are used. Preferably, when flow sensor device 70 is used in an environment having temperature fluctuations or cycling, materials are chosen for body portion 72 and plate portion 73 having TCE's close to the TCE of the material of pressure sensor portion 74.

Pressure sensor portion 74 preferably comprises a standard commercially available pressure sensor device. Pressure sensing portion 74 has a diaphragm 78 with a thickness 79 and includes piezoresistive elements 81. Typically, a cavity 83 is etched in pressure sensor portion 74 using well known processing techniques to form diaphragm 78. Pressure sensor portion 74 may further include temperature and/or offset compensating circuit elements and/or signal processing elements.

Plate portion 73 preferably comprises a heat and chemical resistant material such as PYREX®, silicon, or the like. Optionally, plate portion 73 comprises a semiconductor material. Plate portion 73 includes a hole or via 84 that preferably is substantially centrally located over inner or throat portion 87 of channel 76.

Flow sensor device 70 functions similar to flow sensor device 10. When a fluid passes in one direction over the top surface of pressure sensor portion 74 and through channel 76, hole 84 allows diaphragm 78 to communicate with channel 76 or sense the corresponding pressure differential that results from the flow constricting characteristics of channel 76. Piezoresistive elements 81 detect deflection in diaphragm 78. This deflection correlates to the pressure differential between the top side and the lower side of diaphragm 78. Flow velocity is determined with the measured pressure differential together with the cross-sectional area of channel 76 at an entrance side or the side in which the fluid enters (not shown), the cross-sectional area at inner portion 87 of channel 76, which is less than the cross-sectional area at the entrance side, and the density of the fluid using the formula set-out above.

Preferably, pressure sensing portion 74 and body portion 72 are coupled to plate portion 73 using a glass frit process or the like. Optionally, pressure sensor portion 74 and body portion 72 are coupled to plate portion 73 using an organic adhesive. In an optional embodiment, body portion 72 and plate portion 73 are formed from a single piece of material eliminating the need to attach body portion 72 to plate portion 73.

In a preferred embodiment of flow sensor device 70 for measuring the flow velocity of air in the flow velocity range of 5 to 15 meters/second, pressure sensor portion 74 preferably comprises a differential pressure sensor. A differential pressure sensor such as the MPX2010 or MPX2012 available from Motorola Inc. is suitable. Plate portion 73 preferably comprises Pyrex® or silicon and body portion 72 preferably comprises silicon. Preferably, the dimensions for channel 76 and span 88 are the same as the dimensions set-out above for channel 16 and span 28.

In an optional embodiment, pressure sensor portion 74 is separate from body portion 72. That is, body portion 72 and plate portion 73 form one unit, and pressure sensor portion 74 forms a second unit. In this optional embodiment, body portion 72 is placed, for example, within a fluid stream and pressure sensor portion is placed outside of the fluid stream. Body portion 72 is coupled to pressure sensor portion 74 using capillary tubes for example. One capillary tube providing the pressure in channel portion 76 to one side of pressure sensor portion 74, another capillary tube providing the mainstream pressure to the opposite side of pressure sensor portion 74. This optional embodiment is suitable for hazardous material environments because pressure sensor portion 74 is not directly exposed to the hazardous material.

Figure 5:
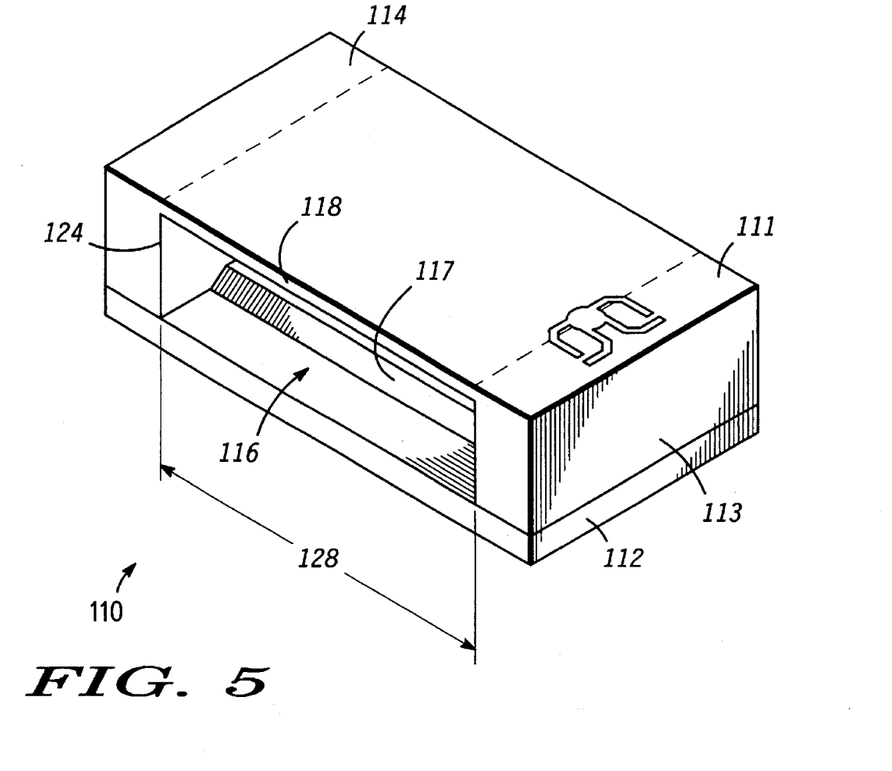
FIG. 5 illustrates a perspective view of yet another embodiment of a flow sensor device in accordance with the present invention.
Figure 6:
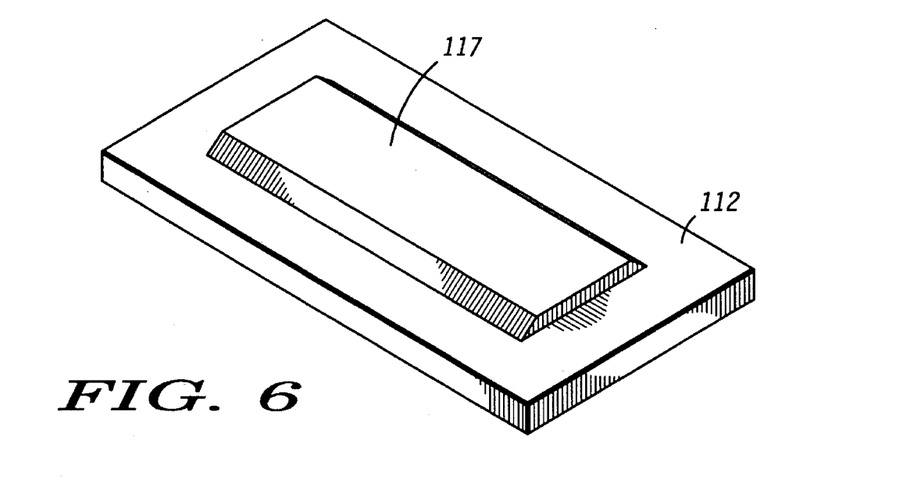
FIG. 6 illustrates a perspective view of a plate portion in accordance with the embodiment of FIG. 5.

FIG. 5 illustrates a perspective view of an additional embodiment of a flow sensor device 110 according to the present invention. Flow sensor device 110 includes a semiconductor die 111 and a plate portion 112. Semiconductor die 111 comprises a pressure sensor portion 114 and a body portion 113 with a channel 116. In this embodiment, plate portion 112 has a tapered or tapering projection or pedestal 117 that is arranged on or formed on plate portion 112 such that when plate portion 112 is coupled to body portion 113, tapered projection 117 reduces the cross-sectional area of channel 116 between an entrance side 124 of channel 116 and an exit side (not shown). Tapered projection 117 is more clearly shown in FIG. 6.

In this embodiment, channel 116 can have straight walls, that is, no taper, and tapered projection 117 alone provides the reduction in the cross-sectional area of channel 116, or channel 116 can have one or more tapered or narrowed walls together with tapered projection 117. It is understood that when channel 116 has tapered walls, the shape of tapered projection 117 is modified to accommodate the geometry of the tapered walls. Preferably, when only tapered projection 117 provides the reduction in cross-sectional area of channel 116, span 128 of diaphragm 118 across channel 116 is substantially uniform.

Figure 7:
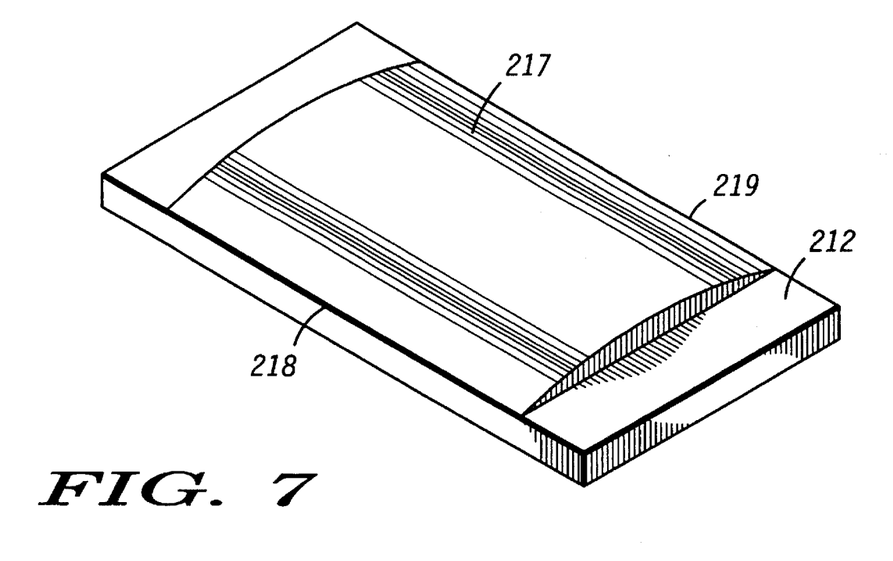
FIG. 7 illustrates a perspective view of another plate portion in accordance with the embodiment of FIG. 5.

FIG. 7 shows an optional embodiment of a plate portion 212 for use with flow sensor device 110. Plate portion 212 has a curved projection portion 217 that extends from a leading edge 218 to a trailing edge 219. Optionally, curved projection portion 217 covers only part of plate portion 212. It is understood that plate portions 112 or 212 may have other geometries that result in a reduced cross-sectional area in channel 116 at some inner portion.

Plate portions 112 and 212 are easily modified for use with flow sensor device 70 shown in FIG. 4. For use with flow sensor device 70, a hole or via is added to extend through tapered projection 117 and plate portion 112 or extend through curved projection portion 217 and plate portion 212. Plate portion 112 or plate portion 212 is then arranged with body portion 72 such that tapered projection 117 or curved projection 217 extends into channel 76 to reduce the cross-sectional area of channel 76 at inner or throat portion 87. It is understood that when plate portions 112 or 212 are used with flow sensor device 70, channel 76 may have straight walls, that is, no tapering or narrowing, or channel 76 may have tapered or narrowed walls depending upon the design requirements. When channel 76 has tapered or narrowed walls, the shape of tapered projection 117 or curved projection 217 is modified to accommodate the shape of the channel walls. In an optional embodiment, body portion 72 and plate portions 112 or 212 are formed from a single piece of material.

When the reduction in channel cross-sectional area is done with the plate portion, such as plate portions 112 or 212, a simplification in manufacturing occurs. For example, a standard channel may be manufactured for a multitude of flow sensor applications and a variety of plate portions such as plate portions 112 or 212 are designed for use with the standard channel to provide the desired flow restriction requirements.

There are other body portions that provide or create a pressure drop that correlates to the velocity of a fluid. For example, a micro-size pitot tube comprising a double hollow needle or the like is associated with or coupled to a pressure sensor device having a diaphragm such that an impact pressure is applied to one side of the diaphragm and a static pressure is applied to the opposite side of the diaphragm.

In one embodiment, one hollow tube (impact pressure tube) is placed at the head of the double hollow needle for measuring the impact pressure. A second hollow tube (static pressure tube) surrounds the impact pressure tube. The static pressure tube has an opening or sidewall tap for measuring the static pressure. The impact pressure tube is associated with one side of the diaphragm and the static pressure tube is associated with the opposite side of the diaphragm. For example, for a pressure sensor device such as pressure sensor device 74 in FIG. 4, a cap or cover having a hole is coupled to the top side of the pressure sensor device. A plate such as plate 73 having a hole is coupled to the lower side of the pressure sensor device. The impact pressure tube is then coupled to one side of the pressure sensor device using a capillary tube for example. Likewise, the static pressure tube is coupled to the opposite side of the diaphragm using a capillary tube for example.

The pitot tube is placed in a fluid stream and the flow velocity is determined from the following equation:

$$V = \sqrt{\frac{2(P_3 - P_1)}{\rho}}$$

where V is flow velocity, $P_3$ is the impact pressure, $P_1$ is the static pressure, and $\rho$ is the fluid density. This embodiment is suitable for biomedical applications and hazardous material applications.

Like the other embodiments shown, the pressure sensor portion of the pitot tube embodiment can include temperature and/or offset compensation and/or signal processing circuit elements providing an integrated flow sensor device. An integrated flow sensor device reduces external monitoring and/or control equipment requirements.

By now it should be appreciated that there has been provided a flow sensor device for sensing or measuring the flow velocity of a fluid. The flow sensor device includes a body portion that creates a pressure drop and a pressure sensing portion that senses the pressure drop. Because the flow sensor device utilizes semiconductor based technology, the flow sensor is small, rugged, and lightweight. This makes the flow sensor device suitable for a wide variety of applications. The flow sensor device utilizes existing piezoelectric pressure sensor technology and standard processing techniques making it cost effective. Signal processing and/or temperature compensating and/or offset compensating elements are integratable within the flow sensor device reducing external monitoring and/or control equipment requirements.

I claim:

1. A flow sensor device comprising:
   a body portion that provides a pressure differential when placed in a fluid stream, wherein the body portion has a duct that extends from an entrance side to an exit side, and wherein the duct has a first and a second opposed sides, a first cross-sectional area at the entrance side, an inner portion between the entrance side and the exit side, and a second cross-sectional area at the inner portion, and wherein the second cross-sectional area is less than the first cross-sectional area;
   a plate portion coupled to the body portion to form one side of the duct; and
   a pressure sensor portion having a diaphragm and piezoresistive elements, the diaphragm associated with the body portion such that the diaphragm deflects based upon the pressure differential, wherein velocity of the fluid stream is determined from the pressure differential.

2. The flow sensor device of claim 1 wherein one of the first and the second opposed sides of the duct has a shape to provide the second cross-sectional area.

3. The flow sensor device of claim 2 wherein the shape is curved.

4. The flow sensor device of claim 1 wherein the plate portion includes a projection that provides the second cross-sectional area.

5. The flow sensor device of claim 1 wherein the body portion and the pressure sensor portion are formed from a semiconductor material, and wherein the diaphragm forms one side of the duct.

6. The flow sensor device of claim 1 wherein the plate portion has a via, the via substantially centrally located over the inner portion, wherein the plate portion is between the pressure sensor portion and the body portion.

7. The flow sensor device of claim 6 wherein the body portion comprises a material having a thermal expansion coefficient close to that of the pressure sensor portion.

8. The flow sensor device of claim 1 wherein the body portion, the pressure sensor portion, and the plate portion are formed from a single piece of material.

9. A micro-machined sensor for sensing flow velocity of a fluid comprising:
   a flow constricting portion having a channel, the channel having two opposed side-walls, a first opening at one end, and a second opening at an opposite end, wherein the channel narrows from the first opening to a throat portion and widens from the throat portion to the second opening such that the channel has a first cross-sectional area at the first opening and a second cross-sectional area at the throat portion, the second cross-sectional area less than the first cross-sectional area;
   a cover portion forming one side of the channel; and
   a pressure sensor portion having a thin partition, the thin partition and piezoresistive elements having a thickness and first and second opposed surfaces, the pressure sensor portion in spaced relationship with the flow constricting portion such that when a fluid passes through the channel, the thin partition deflects as a function of a pressure differential between the first and the second opposed surfaces.

10. The micro-machined sensor of claim 9 wherein the thin partition forms another side of the channel.

11. The micro-machined sensor of claim 10 wherein the thin partition has a span between the two opposed side-walls of the channel, and wherein one of the two opposed sidewalls of the channel has a geometry that narrows the channel to provide the second cross-sectional area.

12. The micro-machined sensor of claim 10 wherein the thin partition has a span between the two opposed side-walls, and wherein the cover portion includes a projection portion that narrows the channel to provide the second cross-sectional area, and wherein the span is substantially uniform from the first opening to the second opening.

13. The micro-machined sensor of claim 9 wherein the cover portion includes a hole, and wherein the pressure sensor portion is attached to one side of the cover portion, and wherein the flow constricting portion is attached to an opposite side of the cover portion.

14. The micro-machined sensor of claim 13 wherein the flow constricting portion and the cover portion are formed from a single piece of material.

15. The micro-machined sensor of claim 9 wherein the flow velocity of the fluid is derived from a formula:

$$V = \sqrt{\frac{2(P_1 - P_2)}{\rho((A_1/A_2)^2 - 1)}}$$

wherein V is the flow velocity, $P_1-P_2$ is the pressure differential, $A_1$ is the first cross-sectional area, $A_2$ is the second cross-sectional area, and $\rho$ is a fluid density.

16. A method for making a flow sensor device comprising the steps of:

forming a channel in a body portion for passing a fluid, the channel extending from an entrance side to an exit side, wherein the channel has a first and a second opposed sides, and wherein the channel has a first cross-sectional area at the entrance side, and wherein the channel has an throat portion between the entrance side and the exit side, the channel having a second cross-sectional area at the throat portion, wherein the second cross-sectional area is less than the first cross-sectional area;

forming a plate portion, the plate portion being coupled to the body portion, the plate portion forming one side of the channel; and forming a pressure sensor portion, the pressure sensor portion having a diaphragm, the diaphragm and piezoresistive having first and second opposed surfaces, wherein the second opposed surface is associated with the body portion such that when the fluid passes through the channel, the diaphragm is deflected based on a pressure differential between the first and second opposed surfaces, and wherein flow velocity is determined from the pressure differential, the first cross-sectional area, and the second cross-sectional area.

17. The method of claim 16 wherein the step of forming the body portion includes forming the body portion from a first semiconductor material, and wherein the step of forming the pressure sensor portion includes forming the pressure sensor portion from a second semiconductor material, and wherein the diaphragm forms one side of the channel.

18. The method of claim 16 wherein the step of forming the plate portion includes forming the plate portion having a via, the via substantially centrally located over the throat portion, wherein the plate portion is between the pressure sensor portion and the body portion.

* * * * *

UNITED STATES PATENT AND TRADEMARK OFFICE
CERTIFICATE OF CORRECTION

PATENT NO. : 5,515,735
DATED : May 14, 1996
INVENTOR(S) : Vijay Sarihan

It is certified that error appears in the above-indentified patent and that said Letters Patent is hereby corrected as shown below:

Claim 16, column 9, line 17
Delete "an" before "throat" and insert --a-- therefor.

Claim 16, column 10, line 3
Delete "piezoresistive".

Signed and Sealed this

Twenty-third Day of December, 1997

Attest:

BRUCE LEHMAN

Attesting Officer

Commissioner of Patents and Trademarks